United States Patent [19]
Drake, Jr.

[11] Patent Number: 6,122,060
[45] Date of Patent: Sep. 19, 2000

[54] METHOD AND APPARATUS FOR DETECTING ULTRASONIC SURFACE DISPLACEMENTS USING POST-COLLECTION OPTICAL AMPLIFICATION

[75] Inventor: Thomas E. Drake, Jr., Fort Worth, Tex.

[73] Assignee: Lockheed Martin Corporation, Fort Worth, Tex.

[21] Appl. No.: 09/345,558

[22] Filed: Jun. 30, 1999

Related U.S. Application Data

[60] Provisional application No. 60/091,229, Jun. 30, 1998, and provisional application No. 60/091,240, Jun. 30, 1998.

[51] Int. Cl.[7] .................................................. G01B 9/02
[52] U.S. Cl. ......................... 356/359; 356/432; 356/345
[58] Field of Search ................................ 356/432, 432 T, 356/349, 345, 359; 385/12, 14

[56] References Cited

U.S. PATENT DOCUMENTS

| | | | |
|---|---|---|---|
| 4,426,155 | 1/1984 | Monchalin | 356/346 |
| 4,633,715 | 1/1987 | Monchalin | 73/657 |
| 4,659,224 | 4/1987 | Monchalin | 356/352 |
| 4,820,981 | 4/1989 | Bussiere et al. | 324/222 |
| 4,966,459 | 10/1990 | Monchalin | 356/358 |
| 5,074,669 | 12/1991 | Opsal | 356/432 T |
| 5,131,748 | 7/1992 | Monchalin et al. | 356/349 |
| 5,137,361 | 8/1992 | Heon et al. | 356/352 |
| 5,402,235 | 3/1995 | Monchalin | 356/357 |
| 5,608,166 | 3/1997 | Monchalin et al. | 73/657 |
| 5,619,326 | 4/1997 | Takamatsu et al. | 356/357 |

*Primary Examiner*—Robert H. Kim
*Attorney, Agent, or Firm*—Gray Cary Ware & Freidenrich, LLP

[57] ABSTRACT

The present invention detects ultrasonic displacements includes a detection laser to generate a first pulsed laser beam to detect the ultrasonic surface displacements on a surface of the target. Collection optics to collect phase modulated light from the first pulsed laser beam either reflected or scattered by the target. An optical amplifier which amplifies the phase modulated light collected by the collection optics. An interferometer which processes the phase modulated light and generate at least one output signal. A processor that processes the at least one output signal to obtain data representative of the ultrasonic surface displacements at the target.

20 Claims, 4 Drawing Sheets

CH1 P-P=12.8mV

CH1 P-P=108mV

METHOD AND APPARATUS FOR DETECTING ULTRASONIC SURFACE DISPLACEMENTS USING POST-COLLECTION OPTICAL AMPLIFICATION

RELATED APPLICATIONS

This application claims the benefit of U.S. Provisional Application No. 60/091,229 filed on Jun. 30, 1998. Additionally, this application incorporates by reference the prior U.S. Provisional Application No. 60/091,240 filed on Jun. 30, 1998 entitled "METHOD AND APPARATUS FOR ULTRASONIC LASER TESTING" to Thomas E. Drake.

TECHNICAL FIELD OF THE INVENTION

The present invention relates generally to a system and method of non-destructive evaluation of materials, and more particularly, to a system and method of processing optical information to detect ultrasonic surface displacements through the use of at least one laser and optically amplifying the scattered return of laser light after collecting it to perform a non-destructive evaluation of a material.

BACKGROUND OF THE INVENTION

In recent years, the use of advanced composite structures has experienced tremendous growth in the aerospace, automotive, and many other commercial industries. While composite materials offer significant improvements in performance, they require strict quality control procedures in the manufacturing processes. Specifically, non-destructive evaluation ("NDE") methods are required to assess the structural integrity of composite structures, for example, to detect inclusions, de-laminations and porosities. Conventional NDE methods are very slow, labor-intensive, and costly. As a result, testing procedures adversely increase the manufacturing costs associated with composite structures.

Various systems and techniques have been proposed to assess the structural integrity of composite structures. One method to generate and detect ultrasound using lasers discloses the use of a first modulated, pulsed laser beam for generating ultrasound on a work piece and a second pulsed laser beam for detecting the ultrasound. Phase modulated light from the second laser beam is then demodulated to obtain a signal representative of the ultrasonic motion at the surface of the work piece. A disadvantage of such a system has been that in order to improve the systems ability to detect ultrasonic motion at the surface of the work piece a more powerful laser is required which may be impractical to construct or could damage the workpiece due to excessive heating.

Another method to generate and detect ultrasound using lasers is disclosed in U.S. patent application Ser. No. 60/091,240 filed on Jun. 30, 1998 to T. E. Drake entitled "Method And Apparatus For Ultrasonic Laser Testing" hereafter DRAKE. DRAKE discloses the use of a first modulated, pulsed laser beam for generating ultrasound on a work piece and a second pulsed laser beam for detecting the ultrasound. Phase modulated light from the second laser beam is then demodulated to obtain a signal representative of the ultrasonic motion at the surface of the work piece. A disadvantage of such a system has been that in order to improve the systems ability to detect ultrasonic motion at the surface of the work piece a more powerful laser is required which suffers from the same problems as the '166 patent.

Another method to generate and detect ultrasound using lasers discloses the use of a laser to detect deformations of a oscillatory or transient nature on a remote target surface. The deformations on the remote target surface can be produced by an ultrasound wave or other excitation. Light from the laser is scattered by the deformations, some of which light is collected by collecting optics and transmitted via a fiber optic to a beam splitter which deflects a small portion of the collected light to a reference detector and delivers the remaining portion of the light to a confocal Fabry-Perot interferometer, which generates an output signal indicative of the deformations on the remote target surface. The reference detector measures the intensity of the scattered laser light at the input of the interferometer to generate a reference signal. A stabilization detector measures the intensity of the scattered laser light at the output of the interferometer to generate a prestabilization signal. The ratio of the reference signal to the prestabilization signal is used to generate a final stabilization signal which drives a piezoelectric pusher inside the interferometer to adjust its resonant frequency. A disadvantage of such a system has been that a portion of the signal is lost at the beam splitter when sent to the reference detector. Again in order to improve the systems ability to detect ultrasonic motion at the surface of the work piece a more powerful laser is required.

An alternative to using a more powerful laser is to decrease the working distance to the part and/or increase the size of the collection aperture. This reduces the F-number of the optical system and has the disadvantage of a corresponding reduction in the working depth of field (DOF). DOF is a measure of how far away from the ideal focal plane an object can be and still maintain acceptable performance. Lower F-number designs generally result in a smaller scan area capability and often require active focusing lens assemblies in order to maintain efficient light collection while scanning complex shaped components. Large collection apertures require the use of single-mirror optical scanning systems, usually in a two-axis gimbal configuration, that are cumbersome and generally slow.

A need exists for a ultrasonic laser system which improves detection capabilities of the system to detect ultrasonic motion at the surface of the workpiece without damaging the workpiece.

Moreover, there is a need for an ultrasonic laser system which improves detection capabilities of the system to detect ultrasonic motion at the surface of the workpiece using practical lasers without damaging the workpiece and functioning with sufficiently large DOF.

SUMMARY OF THE INVENTION

The present invention provides a system and method for detecting ultrasonic surface displacements on a remote target that substantially eliminates or reduces disadvantages and problems associated with previously developed laser ultrasonic systems and methods.

More specifically, the present invention provides a system and method for detecting ultrasonic surface displacements on a target. The system for detecting ultrasonic surface displacements on a target includes a detection laser to generate a first pulsed laser beam to detect the ultrasonic surface displacements at the remote target. Collection optics collect the phase modulated light from the first pulsed laser beam scattered by the remote target. Scattering of the laser beam by the remote target includes all reactions between laser beam and the remote target where the laser beam is redirected with phase modulations induced by surface vibrations or pertobations such as those produced by ultrasonic mechanisms. An optical amplifier amplifies the phase modulated light collected by the collection optics. This optical signal in turn is processed by an interferometer to generate an output signal. A processor or computer system processes the output signal from the interferometer to obtain data representative of the ultrasonic surface displacements at the remote target.

Another embodiment of the present invention includes a method for detecting ultrasonic surface displacements. This method includes the steps of first generating ultrasonic surface displacements at a remote target. These ultrasonic displacements are scattered by a first pulsed laser beam creating a phase modulated scattered return. This phase modulated light from the first pulsed laser beam either reflected or scattered by the remote target is then collected and optically amplified. This optical signal is processed to obtain data representative of the ultrasonic surface displacements at the remote target.

A technical advantage of the present invention is that an improved method for ultrasonic laser testing is provided. That provides rapid, non-contact, and non-destructive inspection techniques that can be applied to complex composite structures. The present invention provides a flexible, accurate and cost effective method for inspecting complex composite structures that is able to rapidly scan and test large-sized composite structures.

Another technical advantage of the present invention is an improved signal-to-noise ratio for the test system due to increased detection intensities reducing the required intensity of the detection laser.

Another technical advantage of the present invention is the ability to use a detection laser with lower output power.

Another technical advantage of the present invention is the possibility of an increased working distance between the target object and the scanner by optically amplifying the phase modulated light.

BRIEF DESCRIPTION OF THE DRAWINGS

For a more complete understanding of the present invention and advantages thereof, reference is now made to the following descriptions taken in conjunction with the accompanying drawings in which like reference numbers indicate like features and wherein.

DETAILED DESCRIPTION OF THE INVENTION

Preferred embodiments of the present invention and its advantages are understood by referring to FIGS. 1 through 7 of the drawings, like numerals being used for like and corresponding parts of the various drawings. The systems and methods of DRAKE are incorporated by reference in the present invention.

Figure 1:
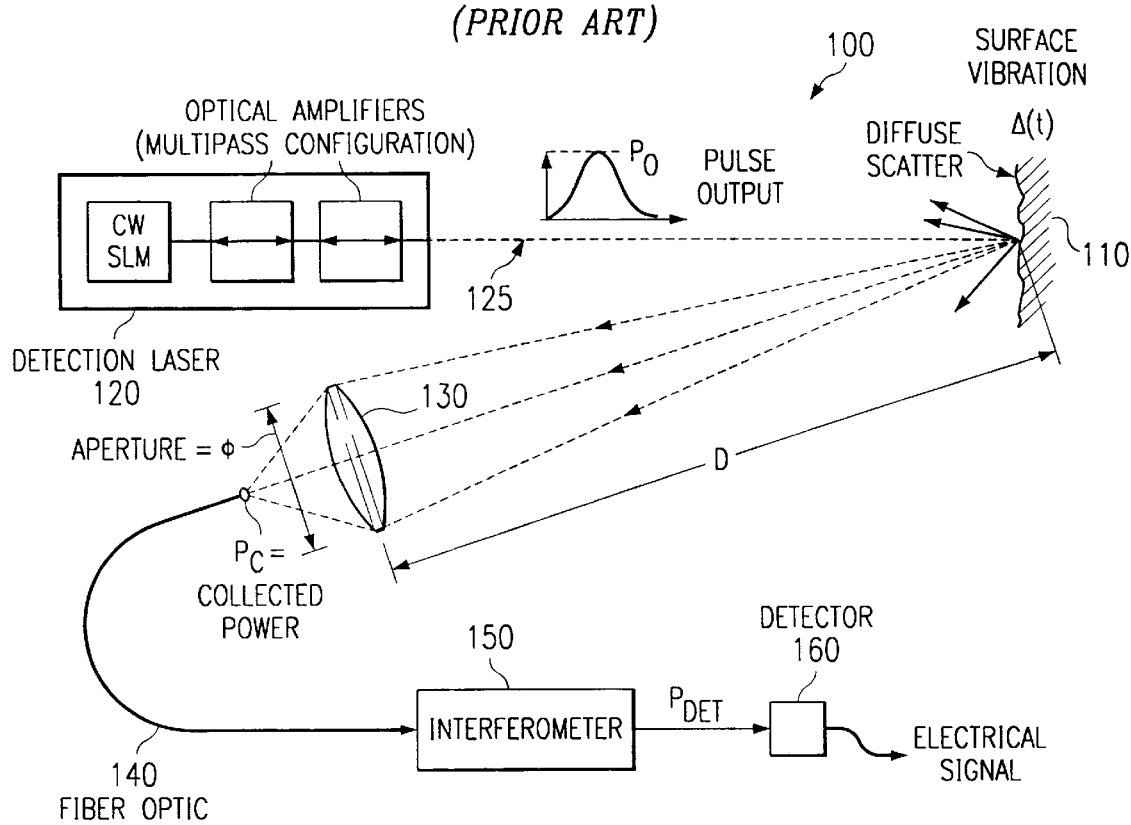
FIG. 1 illustrates a known setup for detecting ultrasonic surface displacements using a detection laser beam.

FIG. 1 illustrates a known setup for generating and detecting ultrasonic surface displacements using a detection laser beam. Detection system 100 utilizes a detection laser 120 to detect ultrasonic surface displacements on a remote target. Detection laser 120 may incorporate a continuous wave (CW) single longitudinal-mode (SLM) seed laser along with a multipass optical amplifier to generate a laser beam 125 with a power $P_o$. The ultrasonic surface displacements in the remote target 110 modulate, scatter and reflect detection laser beam 125, represented by the arrows directed away from the remote target 110. When detection laser beam 125 interacts with the ultrasonic waves present in the remote target 110, detection laser beam 125 is reflected as phase-modulated light. Specifically considering the electric field representation of an incident laser beam 125 as:

$$E_{in} = E \cdot e^{i(\omega t - kx)}$$

where E is the electric field amplitude, $\omega$ is the radial frequency, t is time, the wave vector is defined as $k=2\pi/\lambda$, $\lambda$ is the wavelength, and x is the distance traveled to the target. Beam 125 is scattered or reflected from a surface 110 experiencing a time dependent displacement $\Delta(t)$, and returns along the same path, producing a modulated electric field for $\Delta(t) \ll \lambda$ defined as:

$$E_{in} = E \cdot [1 - 2ik\Delta(t)]e^{i\omega t}$$

The $\Delta(t)$ term must be demodulated using interferometer 150 from this expression for reconstruction of the time history of the surface displacement. Some of the phase modulated light is captured by collection optics 130, which directs the phase-modulated light via fiber optic 140 into interferometer 150. Interferometer 150 demodulates the phase-modulated light and directs its outputs into detector 160 which generates an analog signal for processing.

Collection optics 130 has an aperture diameter of $\phi$ and is spaced a distance D from remote target 110. The power of the collected, phase-modulated light as measured at the output of the collector is $P_c$, and therefore, the power at the input of the interferometer is substantially $P_c$ since there is very little transmission loss associated with fiber optic 140. A typical diffuse surface will have the following relationship describing the amount of collected light for a specified optic diameter and working distance:

$$P_c = \frac{P_o}{4}\left(\frac{\Phi}{D}\right)^2 (1-A)\cos(\theta)$$

Where A represents the absorption of the target and $\theta$ is the angle of incidence. A perfect white diffuse target would have A=0, and a typical dark composite might have an absorption of 90% (A=0.9). Because the loss in interferometer 150 is minimal, the power of the input signal to the detector ($P_{DET}$) is substantially the same as $P_c$.

The signal-to-noise ratio of detector 160 is directly proportional to the square root of the input power:

$$SNR \propto \sqrt{P_{DET}}$$

The formula above suggests that the SNR can be improved by increasing $P_o$, or $\phi$, or by decreasing D. Increasing the ratio of $\phi/D$ will decrease the depth of field of detection system 100, which is undesirable because a decreased depth of field is less flexible.

Alternatively, $P_o$ can be increased. One approach to increase the output of detection laser 120 is to use a shorter pulse width. The pulse of detection laser beam 125, however, must be of a sufficient width to permit detection of ultrasonic surface displacements, and therefore, decreasing its pulse duration degrades its ability to detect such displacements. A second approach is to amplify the detection laser using a multiple pass optical amplifier. However, the gain of a conventional optical amplifier is dependent upon the power of the input signal.

Figure 2:
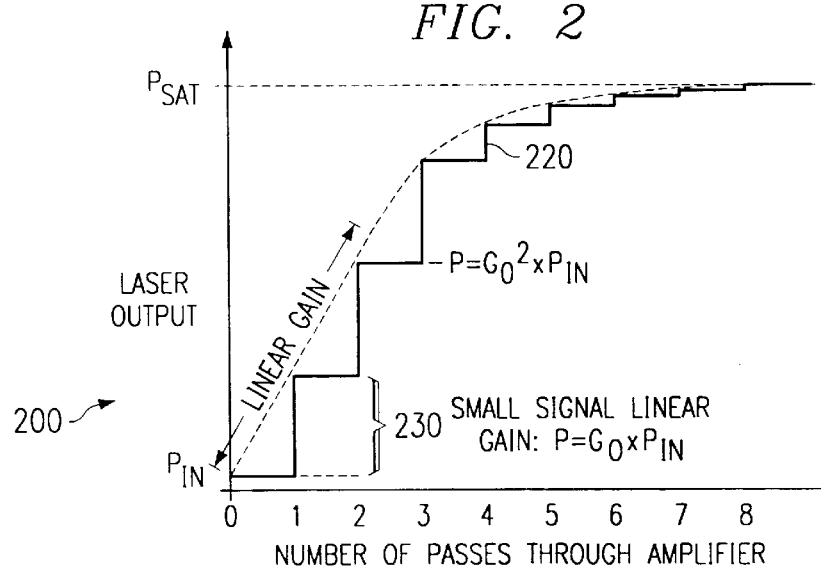
FIG. 2 is a typical gain plot for an optical amplifier illustrating Laser Output versus Number of Passes Through The Amplifier.

FIG. 2 illustrates a gain plot 200 for a typical optical amplifier as a function of the number of passes through the amplifier. Gain plot 200 shows that the typical amplifier has a linear gain 210 for small input signals. However, the gain 220 is not linear as the input signal increases, as illustrated by the leveling of gain plot 200 as the amplifier approaches saturation. Gain plot 200 demonstrates that adding multiple amplifier sections quickly reaches a point of diminishing returns, and therefore, the ability to increase SNR by increasing $P_o$, is limited.

Figure 3:
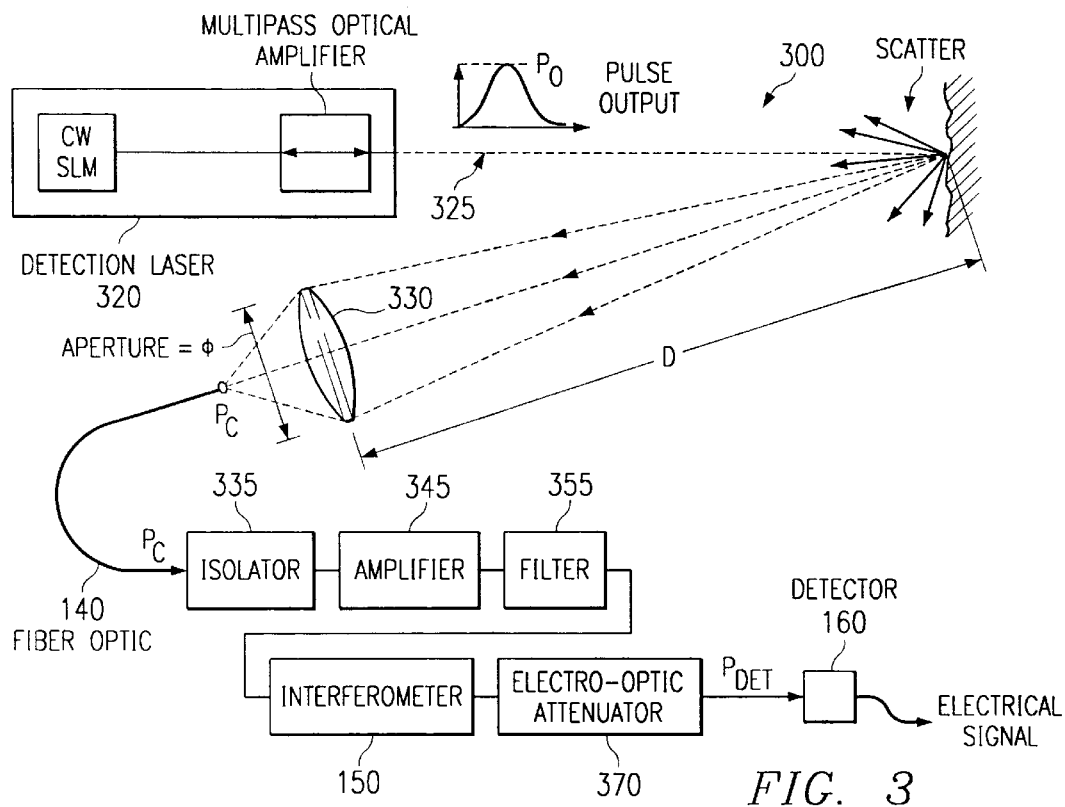
FIG. 3 illustrates the use of a post-collection multipass optical amplifier to yield an improved signal-to-noise ratio.

FIG. 3 illustrates a setup for a new and improved detection system 300. Detection system 300 utilizes a detection laser 120 to detect ultrasonic surface displacements in a remote target 110. Detection laser 120 may incorporate a multi-pass optical amplifier to generate a laser beam 125 with a power $P_o$.

The ultrasonic surface displacements in a remote target 110 may be produced using a generation laser, a piezoelectric transducer, electrical discharge, projectile impact or other known means. The ultrasonic surface displacements modulate, scatter and reflect detection laser beam 325. When detection laser beam 325 interacts with the ultrasonic waves present at the remote target 110, detection laser beam 325 is reflected as phase-modulated light, as illustrated by the arrows directed away from remote target 110.

When a generation laser is used to induce ultrasonic surface displacements, the generation laser must be of a frequency that is readily absorbed into the remote target 110 without causing ablation or breaking down the remote target material, and it must be of sufficient pulse length to induce ultrasonic surface deformations. For example, a transverse-excited atmospheric ("TEA") $CO_2$ laser can be used to produce a 10.6 micron wavelength beam for a 100 nanosecond pulse. The power of the laser must be sufficient to deliver, for example, a 0.5 joule pulse to the remote target, which may require a 50 watt laser. The generation laser should be absorbed as heat into the remote target thereby causing thermoelastic expansion without ablation. Generally, utilizing a wavelength in the ultraviolet range is undesirable because such light can potentially damage the composite material. Optionally, the generation laser and the detection laser may also be applied coaxially to the surface of the remote target object.

The detection laser 320 must be of a frequency that does not induce ultrasonic surface displacements. For example, a Nd:YAG laser can be used. The power of this laser must be sufficient to deliver, for example, a 100 milli-joule, 100 $\mu$second pulse, which may require a one kilo-watt laser.

When detection laser beam 325 interacts with the ultrasonic waves present in remote target 110, detection laser beam 325 is reflected as phase-modulated light. Some of the phase modulated light is captured by collection optics 330. Collection optics 330 may utilize either a large aperture collector or a small aperture collector. For example, a large aperture collector may be a Cassegrain-type reflector, comprised of a primary spherical reflective surface which focuses light upon a secondary spherical reflective surface, which in turn, collects the light. For increased speed and flexibility a small aperture collector is desirable.

Collection optics 330 collect the phase-modulated light and directs it into fiber optic carrier 140, which in turn, directs the phase-modulated light into optical amplifier 345. Optical amplifier 345 may be a multi-pass optical amplifier or other optical amplifier as known to those skilled in the art. Optical isolator assembly 355 will prevent reflected phase modulated light feedback into optical amplifier 345. The amplified, phase-modulated is directed through optical isolator assembly 355. The amplified, phase-modulated light is then directed into interferometer 150, wherein the light is demodulated. The demodulated light is then directed into detector 160 which generates an analog output signal.

This analog signal may comprise an optical signal which may be converted into a digital signal. This digital signal may then be processed to extract data representative of the ultrasonic displacements at the remote target.

Optionally, an optical ranging unit (not shown) can be integrated into detection system 300 to utilize a ranging laser beam to determine the distance between the remote target 110 and the scanning system. Often, it is important to know the distance by which remote target 110 is located from the scanner so that a topographical contour can be created for the remote target and can be correlated to the optical data being collected. Generally, this correlation is recorded on a point-by-point basis.

The power of the collected, phase-modulated light as measured at the output of the collector is Pc, and optical amplifier 345 has a gain G. Therefore, the power of the signal at the output of optical amplifier is $P_c*G$. Because the interferometer has a low loss rate, the power at the output of the interferometer (i.e., the power at the input to the detector, $P_{DET}$) is substantially $P_c*G$.

The signal-to-noise ratio of detector 160 is directly proportional to the square root of the input power:

$$SNR \propto \sqrt{P_{DET}}$$

The introduction of the optical amplifier to amplify $P_c$, however, permits the SNR to be improved by increasing $P_c$, in addition to increasing $P_o$, or $\phi$, or by decreasing D. There are several added advantages. It is no longer critical to increase $P_o$ to the maximum, and therefore, any amplifier that amplifies detection laser 320 can be operated in the efficient, linear gain region. Moreover, optical amplifier 345 can also be operated in the efficient, linear gain region. Because the need for high gain in any one of the amplifiers has been decreased, less costly amplifiers can be used in detection system 300. The increased performance associated with a two amplifier approach (one amplifier in detection laser 320, and one amplifier post-collection), will permit the system to use a smaller aperture $\phi$ and a greater distance D, therefore, providing detection system 300 with greater flexibility without any degradation in performance. On the contrary, detection system 300 enjoys increased performance.

Moreover, optical amplifier 345 will not contribute any substantial additional noise unless $P_c$ exceeds 1 photon per bandwidth of the measurement. Thus, the post-collection optical amplification approach improves the SNR without any substantial increase in noise. Electrical amplification of the analog signal subsequent to detector 160 will not improve the SNR above $\sqrt{P_c}$. This is so because both the signal and the noise component will be amplified.

The following examples illustrate embodiments of the present invention, but should not be viewed as limiting the scope of the invention.

EXAMPLE 1 (No Post-Collection Amplification)

$P_o = 10^3$ W Peak Power (100 mJ pulse, 100 $\mu$S)

$P_c = 10^{-5} * P_o$

Though $P_o$ is significant, $P_c$ can be only a small fraction of $P_o$, because collection efficiency depends upon the reflectivity of remote target 110, and D. Given these assumptions, $P_{DET} = 10^{-5} * 10^3$ W
$= 10^{-2}$ W
$= 10$ mW EXAMPLE 2 (With Post-Collection Amplification)

$P_o = 10$ W Peak Power (1 mJ pulse, 100 $\mu$S)

$P_c = 10^{-5} * P_o$

In Example 2, $P_o$ is 1/100 of the power of the detection laser in Example 1 above. $P_c$ is calculated using the same assumptions as in Example 1. A post-collection amplifier has a gain of 10', which results in $P_{DET} = 10^4 * P_c$
$= 10^4 * 10^{-5} * P_o$
$= 10^4 * 10^{-5} * 10$ W
$= 1$ W Since SNR is proportional to $\sqrt{P_{DET}}$, the increase in SNR for Example 2 over Example 1 is the square root of the increase in power delivered to the detector. That is, there is a 10-fold increase ($\sqrt{100}$) in the SNR for Example 2 over Example 1.

As these two examples illustrate, the use of post-collection optical amplification permits the use of a detection laser with 1/100 of the power as that without the post-collection optical amplifier, yet provides a 10-fold increase in SNR.

Figure 4:
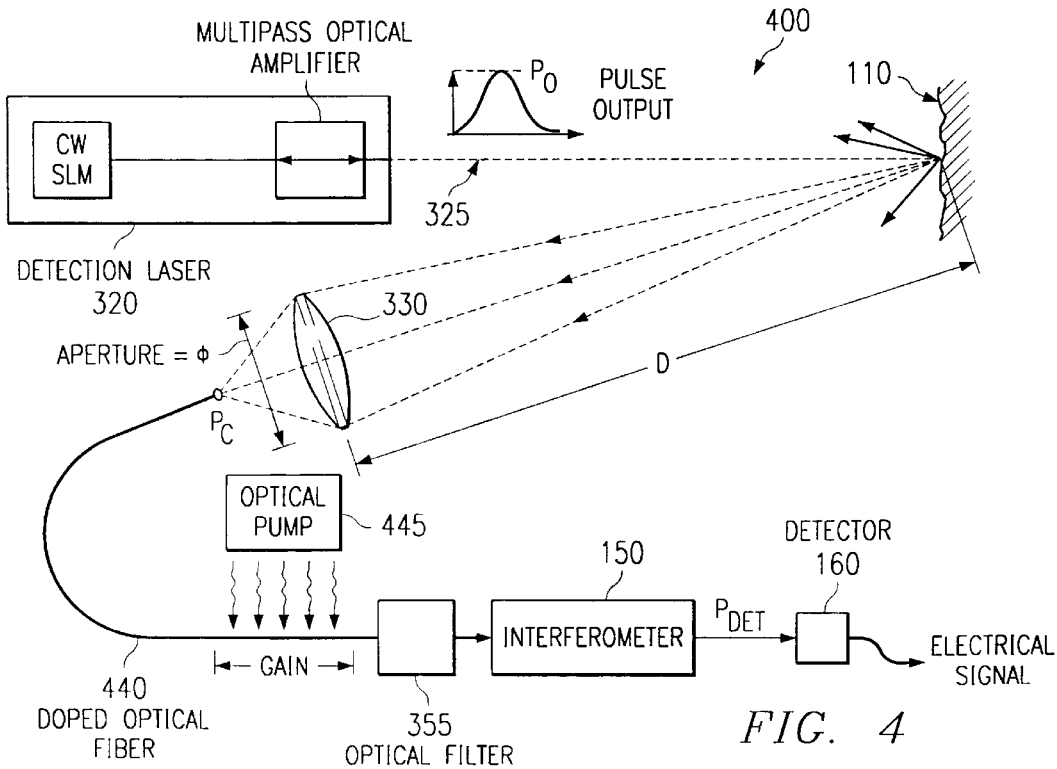
FIG. 4 illustrates the use of doped fiber optics and an optical pump for post-collection optical amplification.

FIG. 4 illustrates a second embodiment to achieve post-collection optical amplification. The setup illustrated in FIG. 4 is very similar to that presented in FIG. 3, and therefore, only the differences will be discussed here.

Collection optics 330 collect the phase-modulated light and direct it into a doped optical fiber 440, which in turn, directs the phase-modulated light into interferometer 150, wherein the light is demodulated. The demodulated light is then directed into detector 160 which generates an analog output signal. An optical pump 445 is coupled to doped fiber optic carrier 440, and acts as an amplifier to increase the power of the signal. The amplified, phase-modulated light is directed through optical isolator assembly 355 prior to being delivered to interferometer 150. The combination of doped optical fiber carrier 440 and optical pump 445 results in an effective gain of $e^{2\alpha L}$. A specific optical amplifier is not critical to the present invention, and therefore, other known optical amplifiers may be used.

Figure 5:
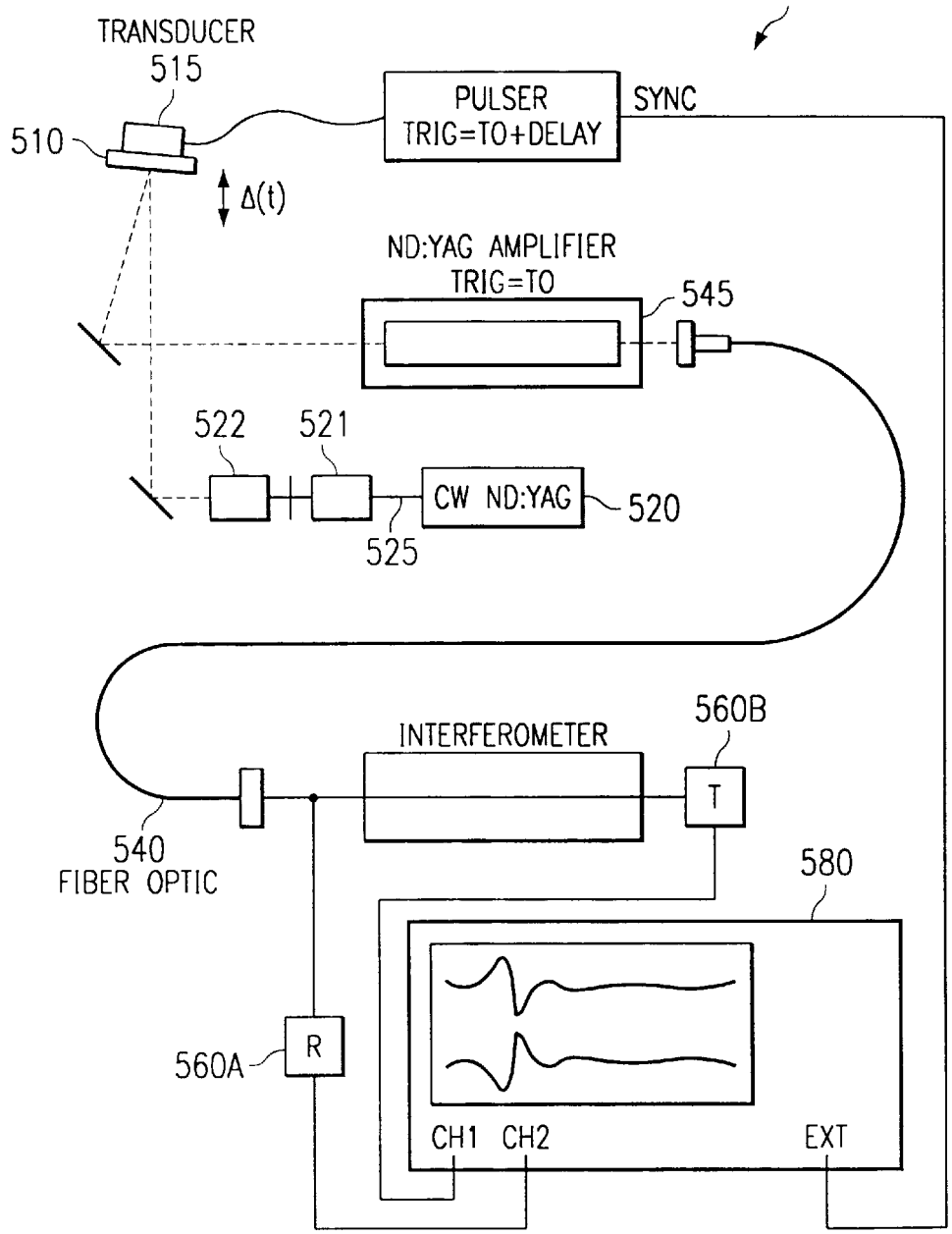
FIG. 5 illustrates a setup for testing the gain associated with post-collection optical amplification.

FIG. 5 illustrates a setup for testing the use of post-collection optical gain approach of the present invention. Detection laser 520 generates a detection laser beam 525 which is directed upon a remote target 510 to detect ultrasonic surface displacements thereon. Detection laser beam 525 is amplified by two external amplifiers 521, 522 before being directed upon surface 510.

In this test setup, the ultrasonic surface displacements in remote target 510 are produced using a piezoelectric transducer 515, which transducer is synchronized using synchronizing means 570. The ultrasonic surface displacements modulate, scatter and reflect detection laser beam 525. When detection laser beam 525 interacts with the ultrasonic waves present in remote target 510, detection laser beam 525 is reflected as phase-modulated light from remote target 510. The reflected, phase-modulated light is collected and directed into optical amplifier 545 where it may be amplified if desired, or may be passed through without amplification, depending on whether amplifier 545) is active or inactive. From amplifier 545, the light is directed via fiber optic 540 into interferometer 550, wherein the reflected and transmitted components of the signal are detected using detectors 560A and 560B, respectively. Detectors 560A and 560B generate analog signals which are then captured for comparison by measurement device 580.

Figure 6:
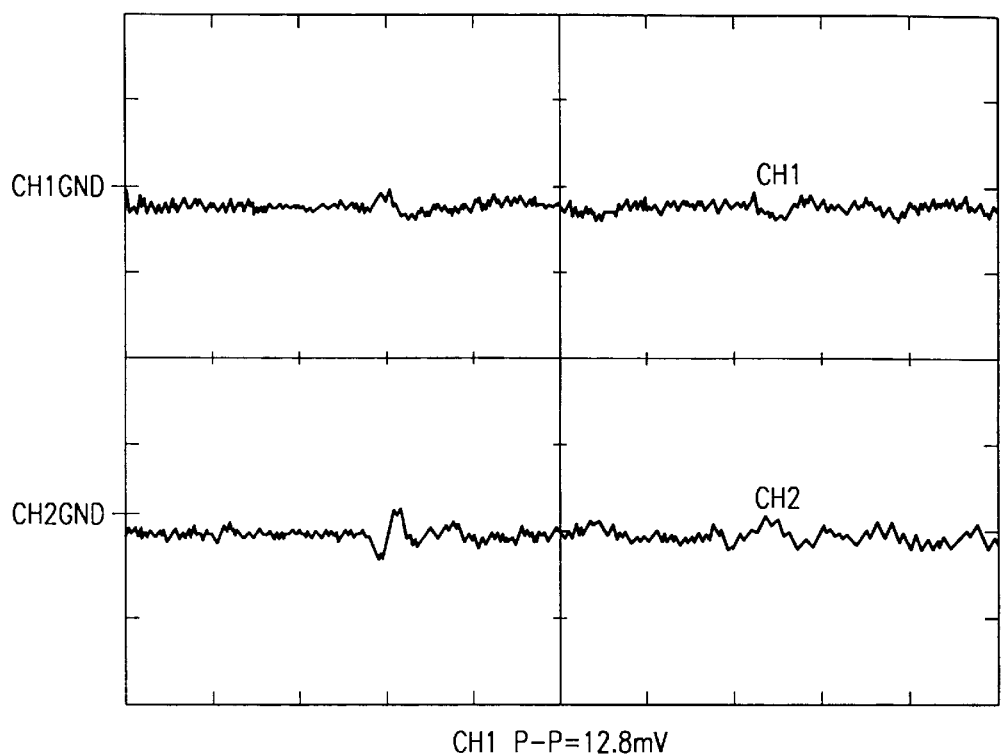
FIG. 6 illustrates reflected and transmitted signals generated using the setup of FIG. 5 without post-collection optical amplification.

FIG. 6 illustrates the reflected and transmitted signals as detected when amplifier 545 is inactive, and thus, passes the collected, phase-modulated light without amplification.

Figure 7:
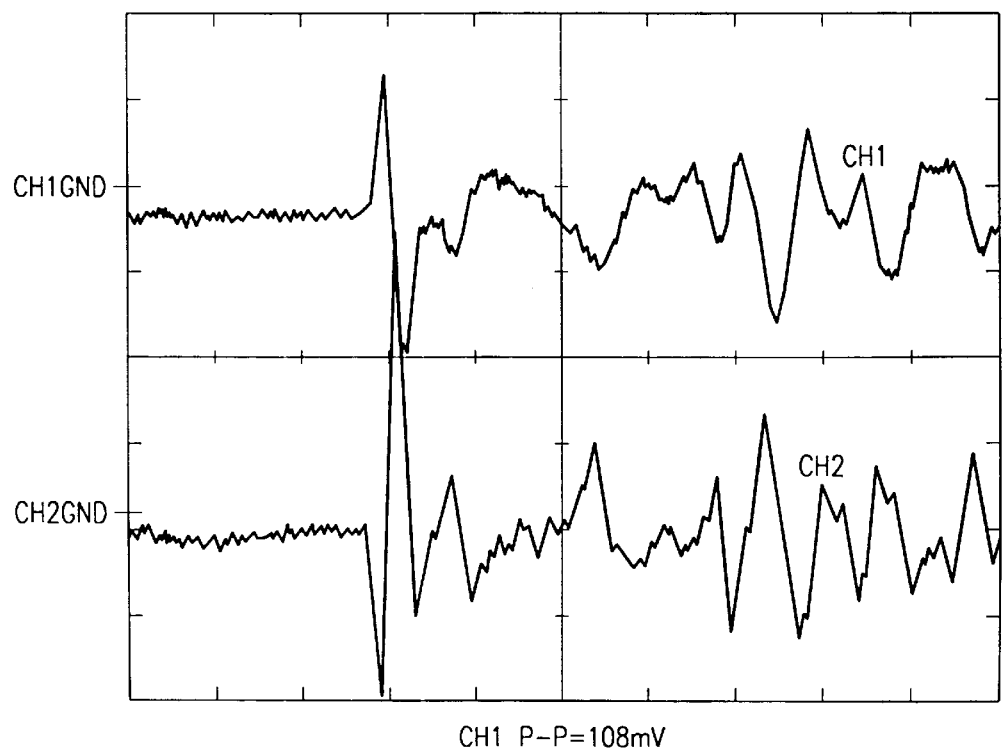
FIG. 7 illustrates reflected and transmitted signals generated using the setup of FIG. 5 with post-collection optical amplification.

FIG. 7 illustrates the reflected and transmitted signals as detected when amplifier 545 is active, and thus, amplifies the collected, phase-modulated light. A comparison of the signals illustrated in FIGS. 6 and 7 demonstrates that the reflected and transmitted signals have been amplified significantly without any substantial increase in noise.

The present invention provides an improved method for ultrasonic laser testing this method provides rapid, non-contact, and non-destructive inspection techniques that can be applied to complex composite structures. This provides a flexible, accurate and cost effective method for inspecting complex composite structures that was not previously available. This method is able to rapidly scan and test large-sized composite structures.

The present invention also improves the signal-to-noise ratio for a laser ultrasonic test system. This increased sensitivity is due to increased detection intensities thus reducing the required intensity of the detection laser.

Similarly, the present invention provides the ability to use a detection laser with lower output power. This allows the use of smaller collection optics and optical scanners.

Moreover, another technical advantage of the present invention is the possibility of an increased working distance between the target object and the scanner by optically amplifying the phase modulated light.

Although the present invention has been particularly shown and described in detail, it should be understood that various changes, substitutions and alterations can be made hereto without departing from the spirit and scope of the invention as defined in the appended claims.

What is claimed is:

1. A method for detecting ultrasonic surface displacements on a target, comprising the steps of:

generating ultrasonic surface displacements at the target;

using a first pulsed laser beam to detect the ultrasonic surface displacements at the target;

collecting phase modulated light from the first pulsed laser beam scattered by the target;

optically amplifying the phase modulated light after the phase modulated light has been collected;

preventing reflected phase modulated light feedback into an optical amplifier with at least one optical isolation assembly placed in the path of propagation of the phase modulated light which has been collected; and processing the phase modulated light to obtain data representative of the ultrasonic surface displacements at the target.

2. The method of claim 1 wherein the step of processing the phase modulated light further comprises the steps of:

using an interferometer to demodulate the phase modulated light for creating at least one optical signal;

converting the at least one optical signal into at least one digital signal; and using a digital signal processor to process the at least one digital signal.

3. The method of claim 2 wherein the step of converting the at least one optical signal into at least one digital signal further comprises the steps of:

converting the at least one optical signal into at least one analog signal; and converting the at least one analog signal into at least one digital signal.

4. The method of claim 1 wherein the ultrasonic surface displacements at the target are generated using a second pulsed laser beam and wherein the first pulsed laser beam is applied coaxially with the second pulsed laser beam.

5. The method of claim 1 wherein the step of optically amplifying the phase modulated light is accomplished using a multi-pass optical amplifier.

6. The method of claim 1 wherein the step of optically amplifying the phase modulated light is accomplished using a doped fiber optic carrier coupled to an optical pump.

7. The method of claim 1 further comprising amplifying the first pulsed laser beam prior to applying it to the target.

8. A method for generating and detecting ultrasonic surface displacements on a target further comprising the steps of:

using a first pulsed laser beam to generate the ultrasonic surface displacements at the target;

amplifying a second pulsed laser beam;

directing the second pulsed laser beam at the target to detect the ultrasonic surface displacements;

collecting phase modulated light from the second pulsed laser beam which is scattered by the target;

optically amplifying the phase modulated light after the phase modulated light has been collected;

preventing reflected phase modulated light feedback into an optical amplifier with at least one optical isolation assembly placed in the path of propagation of the phase modulated light which has been collected; and processing the phase modulated light to obtain data representative of the ultrasonic surface displacements at the target.

9. The method of claim 8, wherein the second pulsed laser beam is applied coaxially with the first pulsed laser beam.

10. The method of claim 8 wherein the step of optically amplifying the phase modulated light is accomplished using a multi-pass optical amplifier.

11. The method of claim 8 wherein the step of optically amplifying the phase modulated light is accomplished using a doped fiber optic carrier coupled to an optical pump.

12. The method of claim 8 wherein the step of processing the phase modulated light comprises:

using an interferometer to demodulate the phase modulated light to create at least one optical signal;

converting the at least one optical signal into at least one digital signal; and using a digital signal processor to process the at least one digital signal.

13. The method of claim 12 wherein the step of converting the at least one optical signal into at least one digital signal comprises:

converting the at least one optical signal into at least one analog signal; and converting the at least one analog signal into at least one digital signal.

14. The method of claim 8 further comprising processing the data representative of the ultrasonic surface displacements to determining a location of flaws or an discontinuities at the target.

15. An system for detecting ultrasonic surface displacements occurring on a surface of a target comprising:

a detection laser to generate a first pulsed laser beam to detect the ultrasonic surface displacements at the target;

collection optics for collecting phase modulated light from the first pulsed laser beam scattered by the target;

an optical amplifier to amplify the phase modulated light collected by the collection optics;

at least one optical isolation assembly placed in the path of propagation of the phase modulated light collected by the collection optics for preventing reflected laser light feedback into optical amplifier;

an interferometer to process the phase modulated light and generate at least one output signal; and a processing unit to process the at least one output signal to obtain data representative of the ultrasonic surface displacements at the target.

16. The system of claim 15 further comprising an optical amplifier to amplify the first pulsed laser beam generated by the detection laser prior to directing the first pulsed laser beam upon the target.

17. The system of claim 15 further comprising an optical ranging unit to calculate a distance by which the target is separated from the system.

18. The system of claim 15 further comprising a generation laser to generate a second pulsed laser beam to induce the ultrasonic surface fluctuations, and wherein the second pulsed laser beam is applied coaxially with the first pulsed laser beam.

19. The system of claim 15 wherein the optical amplifier is a multi-pass optical amplifier.

20. The system of claim 15 wherein the optical amplifier is comprised of a doped fiber optic carrier and a optical pump coupled thereto.

* * * * *